United States Patent
Fukuoka et al.

(10) Patent No.: US 7,794,681 B2
(45) Date of Patent: Sep. 14, 2010

(54) METHOD FOR PRODUCING SILICON OXIDE POWDER

(75) Inventors: Hirofumi Fukuoka, Annaka (JP); Mikio Aramata, Annaka (JP); Satoru Miyawaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 685 days.

(21) Appl. No.: 11/790,031

(22) Filed: Apr. 23, 2007

(65) Prior Publication Data

US 2007/0248525 A1    Oct. 25, 2007

(30) Foreign Application Priority Data

Apr. 24, 2006    (JP) .............................. 2006-118720

(51) Int. Cl.
  *C01B 33/12*    (2006.01)
  *C01B 15/14*    (2006.01)
  *C01B 21/068*    (2006.01)
  *B01D 5/00*    (2006.01)
  *B01D 7/00*    (2006.01)

(52) U.S. Cl. ...................... 423/339; 423/325; 423/335; 423/344

(58) Field of Classification Search ................. 423/335, 423/344, 325, 339; 429/128; 422/244
See application file for complete search history.

(56) References Cited

U.S. PATENT DOCUMENTS 5,096,685 A * 3/1992 Funahashi et al. ........... 423/325

FOREIGN PATENT DOCUMENTS

JP    63-103815 A    5/1988
JP    9-110412 A    4/1997

OTHER PUBLICATIONS

Translation of JP 63103815 to Funahashi et al., publication date May 9, 1988.*

* cited by examiner

*Primary Examiner*—Anthony J Green
*Assistant Examiner*—Pegah Parvini
(74) *Attorney, Agent, or Firm*—Birch, Stewart, Kolasch & Birch, LLP

(57) ABSTRACT

An efficient method for producing a silicon oxide powder at a low cost is provided. This method comprises the steps of heating a powder mixture of a silicon dioxide powder and a metal silicon powder to a temperature of 1,100 to 1,450° C. in an inert gas or under reduced pressure to generate silicon monoxide gas, and precipitating the silicon monoxide gas on a surface of a substrate to produce the silicon oxide powder, and in this method, the silicon dioxide powder has an average particle diameter of up to 1 μm, and the metal silicon powder has an average particle diameter of 30 μm.

6 Claims, 1 Drawing Sheet

METHOD FOR PRODUCING SILICON OXIDE POWDER

CROSS-REFERENCE TO RELATED APPLICATION

This non-provisional application claims priority under 35 U.S.C. §119(a) on Patent Application No. 2006-118720 filed in Japan on Apr. 24, 2006, the entire contents of which are hereby incorporated by reference.

TECHNICAL FIELD

This invention relates to a method for producing a silicon oxide powder which is effective for use in the vapor deposition of a wrapping film and as a cathode active material for lithium ion secondary battery.

BACKGROUND OF THE INVENTION

Conventional methods known in the art for producing silicon oxide powder include a method in which a silicon dioxide-based oxide powder is heat treated in a non-oxidating atmosphere under reduced pressure to generate silicon monoxide vapor, and this silicon monoxide vapor is condensed in gas phase to continuously produce a minute amorphous silicon oxide powder of up to 0.1 μm (JP-A 63-103815: Patent Document 1), and a method in which a silicon starting material is heated for evaporation, and the vapor is deposited on the surface of a surface roughened substrate (JP-A 9-110412: Patent Document 2).

At present, silicon oxide powder is expensive, and further reduction in cost is required if it is to be used for a cathode active material of lithium ion secondary battery. For the cost reduction, improvement in yield and productivity by increasing the reaction speed is effective.

However, the typical conventional methods as described above used in producing the silicon oxide are not the methods primarily developed by taking the cost reduction into consideration, and the means that can be used for increasing the reaction speed is not clearly indicated.

SUMMARY OF THE INVENTION

The present invention has been completed in view of the situation as described above, and an object of the present invention is to produce a silicon oxide powder at a high efficiency and low cost.

The inventors of the present invention have made an intensive study to realize the object as described above, and found that reactivity can be remarkably improved and the increase in the productivity of the silicon oxide powder as well as cost reduction can be realized in the reaction as described above by defining particle size of the silicon dioxide powder and the metal silicon powder which are used for the starting material. The present invention has been completed on the bases such finding.

Accordingly, the present invention provides a method for producing silicon dioxide powder comprising the steps of heating a powder mixture of a silicon dioxide powder and a metal silicon powder to a temperature of 1,100 to 1,450° C. in an inert gas or under reduced pressure to generate silicon monoxide gas, and precipitating the silicon monoxide gas on a surface of a substrate to produce the silicon oxide powder, wherein the silicon dioxide powder has an average particle diameter of up to 1 μm, and the metal silicon powder has an average particle diameter of 30 μm.

EFFECTS OF THE INVENTION

The method for producing a silicon oxide powder of the present invention is capable of remarkably improving the reactivity, and accordingly, the silicon oxide powder can be produced efficiently at a high productivity, and therefore, at a low cost.

DETAILED DESCRIPTION OF THE INVENTION

Figure 1:
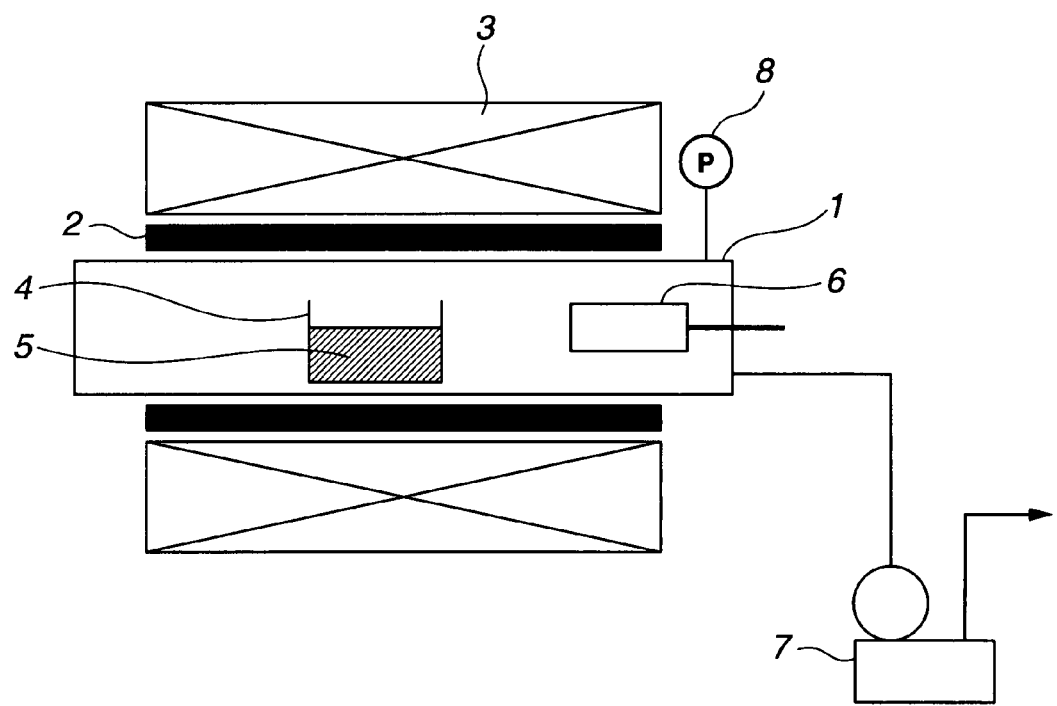
FIG. 1 is a schematic view showing the apparatus used in the Example of the present invention for producing the silicon oxide powder.

Next, the present invention is described in further detail.

The method for producing a silicon oxide powder according to the present invention proceeds by the reaction scheme as shown below. The starting material used in the present invention is a powder mixture of a silicon dioxide powder and a metal silicon powder, and it is important to control the starting material so that the silicon dioxide powder has an average particle diameter of up to 0.1 μm, and the metal silicon powder has an average particle diameter of up to 30 μm.

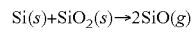

$$Si(s) + SiO_2(s) \rightarrow 2SiO(g)$$

(recovered by solidification by cooling)

The silicon dioxide powder used in the present invention has an average particle diameter of up to 0.1 μm, and the average particle diameter is typically 0.01 to 0.1 μm, and preferably 0.01 to 0.08 μm. The metal silicon powder used in the present invention has an average particle diameter of up to 30 μm, and the average particle diameter is typically 0.05 to 30 μm, and preferably 0.1 to 20 μm. When the silicon dioxide powder has an average particle diameter larger than 1 μm, or when the metal silicon powder has an average particle diameter larger than 30 μm, reactivity will be reduced with the increase in the amount of the material left unreacted and significant decrease in the reaction speed, and accordingly, this results in the decline of the productivity. In the present invention, the average particle size can be measured as a cumulative weight average $D_{50}$ (or median diameter) in the measurement of particle size distribution by laser diffractometry.

In this case, the type of the silicon dioxide powder used is not particularly limited while use of fumed silica is preferable in view of the cost. Also, the type of the metal silicon powder used is not limited, and the metal silicon powder may be produced by breaking the metal silicon block to a predetermined particle size in a mill such as ball mill, media agitation mill, and jet mill commonly used in the art.

According to the reaction scheme as described above, the metal silicon powder and the silicon dioxide powder are ideally mixed at an equivalent molar ratio. However, the investigations of the inventors of the present invention confirmed that a higher reactivity can be realized when the metal silicon is used at a slightly larger amount presumably because of the presence of natural oxide layer on the surface of the metal silicon or minute amount of oxygen in the reaction furnace. More specifically, the silicon dioxide powder and the metal silicon powder are preferably mixed at a molar ratio such that 1<the metal silicon powder/the silicon dioxide powder<1.1, and more preferably, 1.01≦the metal silicon powder/the silicon dioxide powder≦1.08. When the powders are mixed at a molar ratio of the metal silicon powder/the silicon dioxide powder of up to 1, proportion of the silicon dioxide in the reaction residue will be increased, and the reaction may not be completed. On the other hand, when the powders are mixed at a molar ratio of the metal silicon powder/the silicon dioxide powder of 1.1 or higher, proportion of the metal silicon in the reaction residue will be increased, and the reaction also may not be completed.

The conditions used in mixing the silicon dioxide powder and the metal silicon powder are not particularly limited. The reactivity, however, tends to increase with the increase in the degree of mixing, and the degree of mixing is preferably increased by means of using a ball mill mixer, a high shear mixer, and the like. In some cases, water may be added to the powder mixture to utilize adsorption power of water for the improvement of contact efficiency. In this case, the powder mixture after completing the water addition, stirring, and drying may be used for the starting material.

The mixture of the metal silicon powder and the silicon dioxide powder having such physical properties are heated to a temperature in the range of 1,100 to 1,450° C. in an inert gas or under reduced pressure to thereby generate silicon monoxide gas. Improvement of the reactivity is deeply correlated with furnace atmosphere, and in particular, degree of vacuum, and the atmosphere in the reaction furnace is preferably kept at a reduced pressure, and in particular, at a degree of vacuum of up to 100 Pa (and typically in the range of about 1 to 100 Pa, and in particular, about 10 to 100 Pa).

The reaction is preferably conducted at a temperature of 1,100 to 1,450° C., and in particular, at 1,300 to 1,420° C. When the reaction temperature is less than 1,100° C., vapor pressure of the silicon monoxide gas will be reduced and the reactivity will be decreased, and as a consequence, the reaction will be inefficient and a long time will be required for the reaction to complete. On the contrary, when the reaction temperature is higher than 1,450° C., the metal silicon powder used for the starting material will melt to detract from the reactivity.

Next, the thus generated silicon monoxide gas is precipitated on a surface of a substrate. The type and shape of the substrate used for the precipitation is not particularly limited, and any adequate material may be selected depending on the intended use of the product, and exemplary substrates used include a plate of SUS, copper, molybdenum, tungsten, and other metals, graphite, alumina, mullite, silicon carbide, silicon nitride and other ceramic materials. Among these, the preferred are those not containing Fe or Al, and the most preferred is SUS in view of the strength and cost advantage.

The reaction chamber and the precipitation chamber are not particularly limited for their size or shape. However use of a highly hermetic chamber with the leakage of up to 100 lusec is preferable since amount of oxygen in the precipitate that precipitates on the substrate increases when the chamber has poor hermeticity. (100 lusec corresponds to the leakage that invites a pressure increase of 1 µHg/sec in a 1 liter vacuum chamber. 1 lusec=1/760 atm.ml/sec≈1.32×10$^{-3}$ atm.ml/sec).

The reaction mode is not particularly limited, and the production may be accomplished either by a continuous method or a batch operation.

EXAMPLES

Next, the present invention is described in detail by referring to Examples of the present invention and Comparative Examples, which by no means limit the scope of the present invention. In the following Examples and Comparative Examples, the average particle size is the cumulative weight average ($D_{50}$) calculated in the measurement of particle size distribution by laser diffractometry.

Example 1

Silicon oxide powder was produced by using a horizontal furnace shown in FIG. 1. The starting material was prepared by mixing 300 g of a fumed silica powder having an average particle diameter of 0.05 µm and 147 g of a metal silicon powder having an average particle diameter of 8 µm (metal silicon powder/silicon dioxide powder molar ratio=1.05) in a high shear mixer for 10 minutes, adding 300 g of water to the mixture, and drying and dehydrating the mixture at 150° C. for 5 hours. 100 g of this powder mixture (5) used for the starting material was placed in a sample container (4), and the sample container (4) was placed in a furnace tube (1). The interior of the furnace tube (1) was deaerated by using a vacuum pump (7), and when the pressure was reduced to 100 Pa, a heater (2) was turned on, and the temperature was elevated to 1,400° C., and the temperature was maintained at this level for 5 hours. Finally, the interior of the furnace tube (1) was deaerated to 30 Pa. The thus generated silicon monoxide vapor was precipitated on a SUS precipitation substrate (6). The reactivity was 99.8%, and 85 g of silicon oxide powder that precipitated on the precipitation substrate could be recovered.

In FIG. 1, 3 is a heat insulator, and 8 is a pressure gage.

Comparative Example 1

The silicon oxide powder was produced under the same conditions as Example 1 except that the silicon dioxide powder had an average particle diameter of 5 µm. The reaction rate was 75%, and the reactivity was clearly inferior to that of Example 1. The silicon oxide powder recovered was 60 g.

Comparative Example 2

The silicon oxide powder was produced under the same conditions as Example 1 except that a metal silicon powder having an average particle diameter of 35 µm was used. The reaction rate was 88%, and the reactivity was clearly inferior to that of Example 1. The silicon oxide powder recovered was 75 g.

Comparative Example 3

The silicon oxide powder was produced under the same conditions as Example 1 except that a silicon dioxide powder having an average particle diameter of 5 µm and a metal silicon powder having an average particle diameter of 35 µm were used. The reaction rate was 45%, and the reactivity was clearly inferior to that of Example 1. The silicon oxide powder recovered was 38 g.

Japanese Patent Application No. 2006-118720 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing silicon oxide powder comprising the steps of:
   heating a powder mixture of a silicon dioxide powder and a metal silicon powder to a temperature of 1,100 to 1,450° C. in an inert gas or under reduced pressure to generate silicon monoxide gas; and precipitating the silicon monoxide gas on a surface of a substrate to produce the silicon oxide powder, wherein the silicon dioxide powder has an average particle diameter of 0.01 to 0.08 μm, and the metal silicon powder has an average particle diameter of 0.1 to 20 μm, and the silicon dioxide powder and the metal silicon powder are mixed at a molar ratio of 1<metal silicon powder/silicon dioxide powder <1.1.

2. The method for producing silicon dioxide powder according to claim 1, wherein the reaction of the powder mixture of the silicon dioxide powder and the metal silicon powder is conducted under a reduced pressure of up to 100 Pa and at a temperature in the range of 1,300 to 1,420° C.

3. The method for producing silicon dioxide powder according to claim 1, wherein the silicon dioxide powder is fumed silica.

4. A method for producing silicon oxide powder comprising the steps of:

adding water to a powder mixture of a silicon dioxide powder and a metal silicon powder;

stirring the mixture obtained by said adding step;

drying the stirred mixture obtained by said stirring step;

heating the dried mixture obtained by said drying step to a temperature of 1,100 to 1,450° C. in an inert gas or under reduced pressure to generate silicon monoxide gas; and precipitating the silicon monoxide gas on a surface of a substrate to produce the silicon oxide powder, wherein the silicon dioxide powder has an average particle diameter of 0.01 to 0.08 μm, and the metal silicon powder has an average particle diameter of 0.1 to 20 and the silicon dioxide powder and the metal silicon powder are mixed at a molar ratio of 1<metal silicon powder/silicon dioxide powder <1.1.

5. The method for producing silicon dioxide powder according to claim 4, wherein the reaction of the powder mixture of the silicon dioxide powder and the metal silicon powder is conducted under a reduced pressure of up to 100 Pa and at a temperature in the range of 1,300 to 1,420° C.

6. The method for producing silicon dioxide powder according to claim 4, wherein the silicon dioxide powder is fumed silica.

* * * * *